United States Patent [19]

McCarthy

[11] 4,234,780
[45] Nov. 18, 1980

[54] RESTING PLACE FOR REPTILES IN CAPTIVITY

[76] Inventor: Gregory M. McCarthy, 180 Mayfield Ave., Mountain View, Calif. 94043

[21] Appl. No.: 905,220

[22] Filed: May 12, 1978

[51] Int. Cl.³ .................... A01K 61/00; H05B 1/00
[52] U.S. Cl. .................................. 219/200; 119/1; 219/213; 219/548
[58] Field of Search ............... 119/1; 219/318, 344, 219/335, 336, 331, 523, 548, 213, 200, 530

[56] References Cited

U.S. PATENT DOCUMENTS

| | | | |
|---|---|---|---|
| 1,567,855 | 12/1925 | Meany et al. | 219/344 |
| 1,692,021 | 11/1928 | Auer | 219/344 |
| 1,902,274 | 3/1933 | Berry | 219/344 |
| 2,758,748 | 9/1953 | Reid | 219/213 |
| 2,842,651 | 8/1958 | Neely | 219/530 |
| 2,866,066 | 12/1958 | Neely | 219/548 |
| 3,059,091 | 10/1962 | Wenzel | 219/318 |

FOREIGN PATENT DOCUMENTS

| | | | |
|---|---|---|---|
| 2428233 | 1/1976 | Fed. Rep. of Germany | 219/213 |
| 253404 | 4/1967 | German Democratic Rep. | 219/213 |
| 256783 | 8/1926 | United Kingdom | 219/344 |

*Primary Examiner*—B. A. Reynolds
*Assistant Examiner*—Bernard Roskoski
*Attorney, Agent, or Firm*—Flehr, Hohbach, Test, Albritton & Herbert

[57] ABSTRACT

A cast body of concrete material having abrasive surface portions contains an electrical heating element to provide a warmed resting place for attracting and warming animals thereon, such as reptiles while providing an abrasive, sandy exterior to aid reptiles when shedding their skin.

1 Claim, 1 Drawing Figure

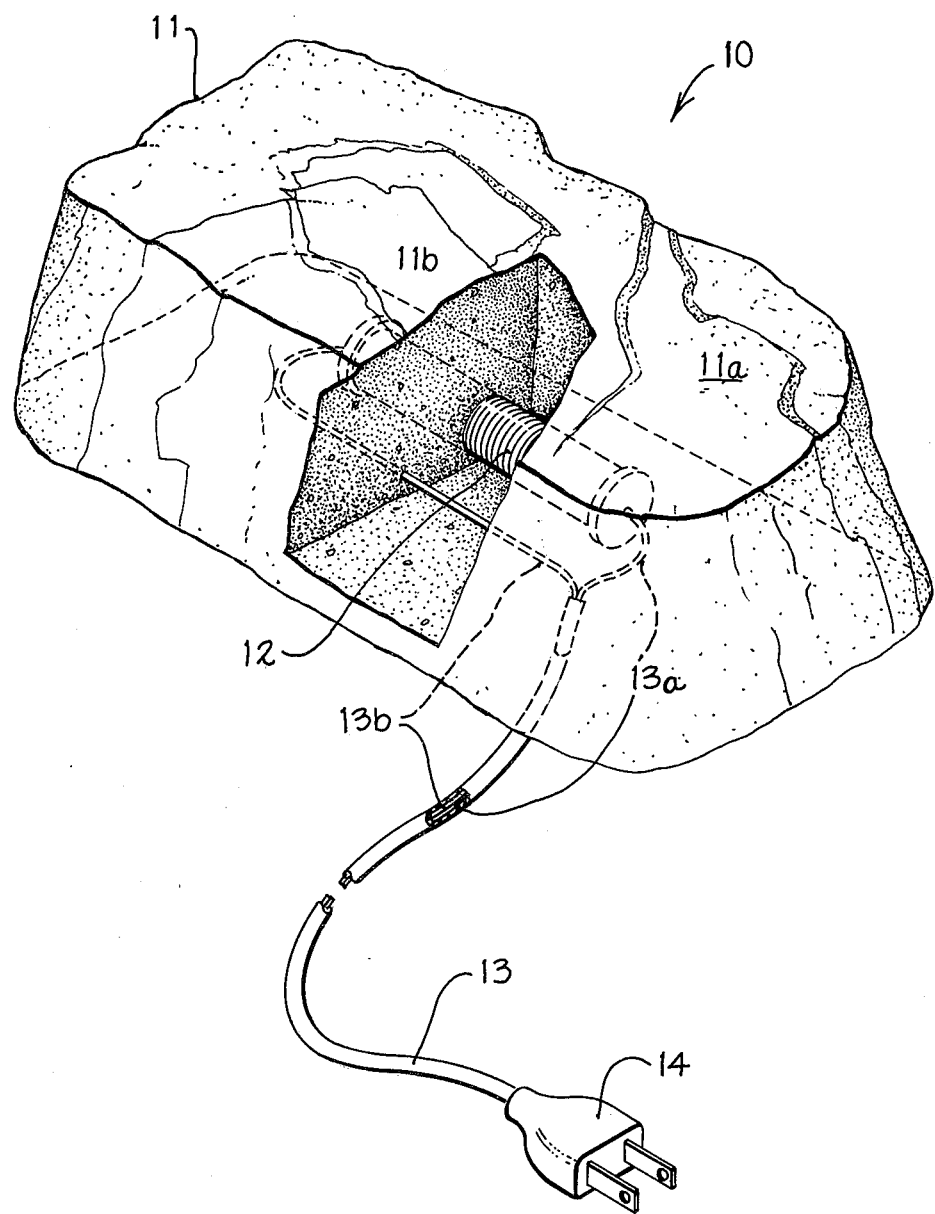

RESTING PLACE FOR REPTILES IN CAPTIVITY

BACKGROUND OF THE INVENTION

This invention pertains to an internally heated resting place for animals and more particularly such a resting place suitable for use with animals in captivity such as for use with a vivarium.

Heretofore animals maintained in captivity, such as snakes, birds, and other small animals, have been typically warmed by means of locating an incandescent light bulb within the container in which the animal is maintained. This arrangement has the drawback that the animals can be burned by the light bulb since the surface temperature of the light bulb becomes quite hot.

As is known, in the case of snakes, they seek warm surfaces on which to lie in order to aid their digestion. Accordingly, they are frequently seen on highways and other sun warmed surfaces.

It is known to employ a conventional, retangular brick having a hole drilled through it for receiving a heating coil. After inserting an electrical heating coil into the drilled hole, both ends of the hole are sealed.

SUMMARY OF THE INVENTION AND OBJECTS

In general there has been provided herein an animal rest or pad comprising a rocklike body of material having abrasive surface portions and containing means for heating the rocklike material for warming same to provide a warmed resting place for an animal to repose thereon.

In general it is an object of the present invention to provide an animal resting place or pad for use within an animal container such as a vivarium for reptiles or a cage for birds or the like whereby the animal can warm itself by reposing upon the upper exposed surface.

It is another object of the present invention to provide a reptile rest having a somewhat abrasive surface and a dimension therearound whereby a reptile or snake can wrap itself about the body and use the abrasive surface to agitate the skin of the reptile to assist the reptile in removing its skin.

Another object of the present invention is to provide a reptile rest of a type which is warmed so as to attract a reptile to it and, having attracted the reptile to it, serve to provide the reptile with means for assisting the reptile in removing its skin.

The foregoing and other objects of the present invention will become more readily evident from the following detailed description of a preferred embodiment when considered in conjunction with the drawings.

BRIEF DESCRIPTION OF THE DRAWINGS

The single FIGURE of the drawing shows a perspective view of an animal rest suitable for use with reptiles and birds.

DETAILED DESCRIPTION OF PREFERRED EMBODIMENT

An animal rest or pad assembly 10 comprises a body 11 of rocklike material preferrably formed of cement, sand, gravel and coloring so that the body 11 blends in with the coloration of the surface material upon which it is located. In addition, in casting body 11 calcium chloride can be added to the mixture to act as a setting agent to hasten the setting time in which the body of material solidifies.

The upper surface of body 11 is formed with a number of platcau or mesa-like regions 11a, 11b, etc. so as to readily blend with the surface on which it is located, such as sand, gravel or the like in the case of snakes.

Heating means embedded within body 11 serves to warm body 11 to form a warmed resting place for an animal to repose thereon. Accordingly, the heating means comprises a resistor element 12 of sufficiently large value, such as 2400 ohms, embedded within body 11 capable to heat body 11 and reduce the current flow through the electrical cord 13 coupled to the ends of resistor 12.

Thus, one lead 13a of an electrical cord 13 is coupled to one end of resistor element 12 while the other lead of cord 13 is coupled to the other end of element 12. A wall plug 14 at the other end of cord 13 couples to a power supply, such as a conventional wall outlet, for energizing resistor 12 for heating body 11.

As thus arranged, by warming body 11 a reptile, such as a snake, will be attracted to it for purposes of lying in repose upon it.

However, since the exterior surface of body 11 will necessarily be somewhat abrasive due to the fact that it is made from sand and since body 11 includes a periphery of a length which serves to permit a reptile such as a snake to extend substantially around body 11, the reptile can rub against the abrasive surface portions of body 11 to aid in shedding its skin.

From the foregoing it will be readily evident that there has been provided an improved resting place or pad for use by reptiles in a vivarium or animals in other captive locations which can be advantageously used by the reptile while, at the same time not requiring too great a current to be drawn through the connection cord 13.

I claim:

1. A reptile rest or pad comprising a simulated natural rock formed with uneven surface portions on its sides and top, said top surface forming a resting place for reptiles, said rock being formed as a cast body of conrete, electric heating means embedded within said rock for warming same to attract an elongate reptile to lie upon said top surface, said rock having an exposed, uneven, abrasive, peripheral side wall surface, said periphery having a length serving to permit a reptile to extend substantially around same as said reptile rubs against said side wall surface to aid in shedding its skin.

* * * * *